United States Patent
Schrooten et al.

(10) Patent No.: US 9,214,687 B2
(45) Date of Patent: Dec. 15, 2015

(54) FLUID MANIFOLD AND METHOD THEREFOR

(75) Inventors: Jeremy Schrooten, Misson (CA); Paul Sobejko, North Vancouver (CA); Joerg Zimmermann, Vancouver (CA); Isabelle Depatie, Grenoble (FR)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 13/361,808

(22) Filed: Jan. 30, 2012

(65) Prior Publication Data

US 2012/0264036 A1 Oct. 18, 2012

Related U.S. Application Data

(63) Continuation of application No. 12/053,366, filed on Mar. 21, 2008.

(60) Provisional application No. 60/919,472, filed on Mar. 21, 2007.

(51) Int. Cl.
   *H01M 8/02* (2006.01)
   *H01M 8/04* (2006.01)
   *H01M 8/24* (2006.01)

(52) U.S. Cl.
   CPC ........ *H01M 8/04201* (2013.01); *H01M 8/0258* (2013.01); *H01M 8/2485* (2013.01); *Y02E 60/50* (2013.01); *Y10T 137/0352* (2015.04); *Y10T 137/2224* (2015.04)

(58) Field of Classification Search
   CPC .......... H01M 8/2485; H01M 8/04201; H01M 8/04089; Y02E 60/50
   USPC ......... 429/433, 444, 454, 456, 457, 458, 513, 429/514, 452, 462, 508, 515
   See application file for complete search history.

(56) References Cited

U.S. PATENT DOCUMENTS

| | | |
|---|---|---|
| 5,388,635 A | 2/1995 | Gruber et al. |
| 6,158,712 A | 12/2000 | Craig |
| 6,159,629 A | 12/2000 | Gibb et al. |
| 6,321,791 B1 | 11/2001 | Chow |
| 6,431,212 B1 | 8/2002 | Hayenga et al. |
| 6,561,208 B1 * | 5/2003 | O'Connor et al. ......... 137/15.18 |
| 6,619,311 B2 | 9/2003 | O'Connor et al. |
| 6,755,211 B1 | 6/2004 | O'Connor et al. |
| 6,756,019 B1 | 6/2004 | Dubrow et al. |
| 6,857,449 B1 | 2/2005 | Chow |

(Continued)

FOREIGN PATENT DOCUMENTS

| | | |
|---|---|---|
| EP | 1498971 A2 | 1/2005 |
| EP | 1498971 A2 | 1/2005 |

(Continued)

OTHER PUBLICATIONS

"U.S. Appl. No. 12/053,366, Response filed Sep. 20, 2010 to Final Office Action mailed Jul. 19, 2010", 13 pgs.

(Continued)

*Primary Examiner* — Sean P Cullen
(74) *Attorney, Agent, or Firm* — Baker & Hostetler LLP (57) ABSTRACT

A electrochemical cell system includes a fluid manifold having a layered structure. The fluid manifold includes at least one conduit layer having a first side and a second side. The at least one conduit layer has at least one conduit channel.

18 Claims, 6 Drawing Sheets

(56) References Cited

U.S. PATENT DOCUMENTS

| | | | |
|---|---|---|---|
| 6,890,067 B2 | 5/2005 | Hock et al. | |
| 6,929,030 B2 | 8/2005 | Unger et al. | |
| 6,986,961 B1 | 1/2006 | Ren et al. | |
| 7,168,680 B2 | 1/2007 | Koeneman | |
| 8,173,326 B2 | 5/2012 | Lundblad et al. | |
| 2002/0164518 A1 | 11/2002 | Wilkinson et al. | |
| 2003/0124409 A1 | 7/2003 | Cramer et al. | |
| 2003/0136453 A1* | 7/2003 | Johnson | 138/30 |
| 2003/0229385 A1 | 12/2003 | Elkins | |
| 2004/0062965 A1* | 4/2004 | Morse et al. | 429/30 |
| 2004/0079424 A1 | 4/2004 | Takeda et al. | |
| 2004/0137300 A1 | 7/2004 | Gemmen et al. | |
| 2004/0209142 A1* | 10/2004 | Becerra et al. | 429/34 |
| 2005/0064256 A1* | 3/2005 | Morse et al. | 429/19 |
| 2005/0072946 A1 | 4/2005 | Studer et al. | |
| 2005/0221147 A1 | 10/2005 | Shioya et al. | |
| 2006/0042698 A1 | 3/2006 | Koeneman et al. | |
| 2006/0127734 A1* | 6/2006 | McLean et al. | 429/34 |
| 2006/0141328 A1 | 6/2006 | Johnston et al. | |
| 2006/0147787 A1 | 7/2006 | Yamauchi et al. | |
| 2007/0026269 A1 | 2/2007 | Nakakubo | |
| 2007/0056634 A1 | 3/2007 | Yokoi et al. | |
| 2008/0145736 A1* | 6/2008 | Pratt et al. | 429/34 |
| 2008/0311458 A1 | 12/2008 | Schrooten et al. | |
| 2009/0081493 A1* | 3/2009 | Schrooten et al. | 429/13 |
| 2010/0035110 A1 | 2/2010 | Lundblad | |

FOREIGN PATENT DOCUMENTS

| | | |
|---|---|---|
| JP | 2004-031199 | 1/2004 |
| JP | 2004-031199 A | 1/2004 |
| JP | 2006-269355 A | 10/2006 |
| JP | 2006269355 A | 10/2006 |
| SG | 155569 A1 | 10/2012 |
| WO | WO-95/08716 A2 | 3/1995 |
| WO | WO-9508716 A2 | 3/1995 |
| WO | WO-01/78893 A2 | 10/2001 |
| WO | WO-0178893 A2 | 10/2001 |
| WO | WO-2004/034485 A2 | 4/2004 |
| WO | WO-2004034485 A2 | 4/2004 |
| WO | WO 2007117212 A2 * | 10/2007 |
| WO | WO-2008/026713 A1 | 3/2008 |
| WO | WO-2008/026714 A1 | 3/2008 |
| WO | WO-2008026713 A1 | 3/2008 |
| WO | WO-2008026714 A1 | 3/2008 |
| WO | WO-2008/113182 A1 | 9/2008 |
| WO | WO-2008113182 A1 | 9/2008 |

OTHER PUBLICATIONS

"Singapore Application Serial No. 200906222-5, Search Report and Written Opnion nailed Apr. 12, 2011", 15 pgs.

"U.S. Appl. No. 12/053,366, Advisory Action mailed Oct. 18, 2010", 3 pgs.

"U.S. Appl. No. 12/053,366, Appeal Brief filed Dec. 20, 2010", 13 pgs.

"U.S. Appl. No. 12/053,366, Decision on Appeal mailed Oct. 1, 2012", 9 pgs.

"U.S. Appl. No. 12/053,366, Examiner Interview Summary mailed Jul. 8, 2010", 4 pgs.

"U.S. Appl. No. 12/053,366, Examiner's Answer to Appeal Brief Feb. 14, 2011", 17 pgs.

"U.S. Appl. No. 12/053,366, Final Office Action mailed Jul. 19, 2010", 17 pgs.

"U.S. Appl. No. 12/053,366, Non-Final Office Action mailed Dec. 14, 2009", 10 pgs.

"U.S. Appl. No. 12/053,366, Reply Brief filed Apr. 14, 2011", 3 pgs.

"U.S. Appl. No. 12/053,366, Response filed Apr. 12, 2010 to Non-Final Office Action mailed Dec. 14, 2009", 15 pgs.

"U.S. Appl. No. 12/053,366, Response filed Jun. 20, 2010 to Final Office Action mailed Jul. 19, 2010", 13 pgs.

"U.S. Appl. No. 12/053,366, Response filed Oct. 9, 2009 to Restriction Requirement mailed Sep. 9, 2009", 8 pgs.

"U.S. Appl. No. 12/053,366, Restriction Requirement mailed Sep. 9, 2009", 7 pgs.

"Chinese Application Serial No. 200880016919.2, Office Action mailed Jan. 19, 2012", 3 pgs.

"Chinese Application Serial No. 200880016919.2, Office Action mailed Dec. 17, 2010", (w/ English Translation), 11 pgs.

"Chinese Application Serial No. 200880016919.2, Office Action Mailed Aug. 20, 2012", 3 pgs.

"Chinese Application Serial No. 200880016919.2, Response filed Mar. 31, 2012 to Office Action mailed Jan. 19, 2012", (w/ English Translation of Amended Claims), 13 pgs.

"Chinese Application Serial No. 200880016919.2, Response filed May 3, 2011 to Office Action mailed Dec. 17, 2010", (w/ English Translation of Claims), 34 pgs.

"Chinese Application Serial No. 200880016919.2, Response filed Nov. 5, 2012 to Office Action mailed Aug. 20, 2012", w/English claims, 14 pgs.

"European Application Serial No. 08733645.9, Extended European Search mailed Jul. 21, 2011", 9 pgs.

"European Application Serial No. 08733645.9, Response filed Feb. 9, 2012 to Extended European Search mailed Jul. 21, 2011", 12 pgs.

"European Application Serial No. 08733645.9, Office Action mailed Apr. 12, 2012", 6 pgs.

"European Application Serial No. 08733645.9, Response filed Dec. 13, 2012 to Office Action mailed Apr. 12, 2012", 12 pgs.

"International Application Serial No. PCT/CA2008/000535, International Search Report mailed Jul. 21, 2008", 6 pgs.

"International Application Serial No. PCT/CA2008/000535, Written Opinion mailed Jul. 21, 2008", 5 pgs.

"International Application Serial No. PCT/CA2008/000541, International Preliminary Report on Patentability mailed Oct. 1, 2009", 8 pgs.

"International Application Serial No. PCT/CA2008/000541, International Search Report mailed Jun. 23, 2008", 6 pgs.

"International Application Serial No. PCT/CA2008/000541, Written Opinion mailed Jun. 23, 2008", 6 pgs.

"Singapore Application Serial No. 200906222-5, Response Filed Sep. 12, 2011 to Office Action mailed Apr. 12, 2011", 4 pgs.

"Singapore Application Serial No. 200906222-5, Search Report and Written Opinion mailed Apr. 12, 2011", 15 pgs.

Debray, A., et al., "A passive micro gas regulator for hydrogen flow control", J. Micromech. Microeng., 15, (2005), S202-S209.

\* cited by examiner

FLUID MANIFOLD AND METHOD THEREFOR

PRIORITY OF INVENTION

This application is a continuation application of U.S. patent application Ser. No. 12/053,366, filed Mar. 21, 2008, which application claims the benefit of priority under 35 U.S.C. §119(e) to U.S. Provisional Patent Application Ser. No. 60/919,472, filed Mar. 21, 2007, which applications are herein incorporated by reference in their entirety.

TECHNICAL FIELD

The present document relates to fluid management technology. More specifically, it relates to a fluid manifold.

BACKGROUND

Trends in technology are progressing towards smaller scales for systems in a variety of applications. Fluidic systems can be integrated within restrictive form factors imposed by the system to manipulate the transport of fluid. For example, flow-modulating components can be arranged for functions such as reactant delivery, heat transfer, and dosing of fluids.

Electronic components, such as personal electronic devices, are trending to become smaller in size. As electronic components are designed in smaller in size and incorporate sophisticated and complex technology, the demands on the power supply become greater. For instance, the power supply may need to occupy less volume or a smaller footprint to accommodate the addition of the technology to the device. The additional technology may also require that the power supply last for longer periods of time. In addition, portable electronic device may need to have energy storage maintained while the power supply shrinks.

An example of a power supply for the electronic components is a electrochemical cell system. In order to make a smaller electrochemical cell system, many individual components of the system, such as a fluid delivery component can be made smaller, but need to meet the technical requirements of the electrochemical cell system. For instance, the fluid delivery component may need to maintain a certain pressure, without occupying an overall significant volume of the electrochemical cell system, and without interfering with the assembly of the electrochemical cell system. Furthermore, the functionality of the electrochemical cell system must not be compromised.

DETAILED DESCRIPTION

The following detailed description includes references to the accompanying drawings, which form a part of the detailed description. The drawings show, by way of illustration, specific embodiments in which the fluid manifold and fuel cell fuel systems and methods may be practiced. These embodiments, which are also referred to herein as "examples" or "options," are described in enough detail to enable those skilled in the art to practice the present invention. The embodiments may be combined, other embodiments may be utilized or structural or logical changes may be made without departing from the scope of the invention. The following detailed description is, therefore, not to be taken in a limiting sense and the scope of the invention is defined by the appended claims and their legal equivalents.

In this document, the terms "a" or "an" are used to include one or more than one, and the term "or" is used to refer to a nonexclusive "or" unless otherwise indicated. In addition, it is to be understood that the phraseology or terminology employed herein, and not otherwise defined, is for the purpose of description only and not of limitation.

A fluid manifold is provided herein. In the following examples, a fuel manifold for a electrochemical cell system is discussed. However, the fluid manifold is not necessarily so limited and can be used in other types of fluidic control systems or other types of systems in need of fluid management. For instance, the fluid manifold can be used to deliver or remove other types of fluids, including, but not limited to water, oxidant, or a heat transfer fluid. For instance, the fluid manifold includes, but is not limited to, a fuel manifold, a heat transfer manifold, an oxidant manifold, or a water removal manifold.

DEFINITIONS

As used herein, "fluid" refers to a continuous, amorphous substance whose molecules move freely past one another and that has the tendency to assume the shape of its container. A fluid may be a gas, liquefied gas, liquid or liquid under pressure. Examples of fluids may include fluid reactants, fuels, oxidants, and heat transfer fluids. Fluid fuels used in fuel cells may include hydrogen gas or liquid and hydrogen carriers in any suitable fluid form. Examples of fluids include air, oxygen, water, hydrogen, alcohols such as methanol and ethanol, ammonia and ammonia derivatives such as amines and hydrazine, silanes such as disilane, trisilane, disilabutane, complex metal hydride compounds such as aluminum borohydride, boranes such as diborane, hydrocarbons such as cyclohexane, carbazoles such as dodecahydro-n-ethyl carbazole, and other saturated cyclic, polycyclic hydrocarbons, saturated amino boranes such as cyclotriborazane, butane, borohydride compounds such as sodium and potassium borohydrides, and formic acid.

As used herein, "fluid enclosure" may refer to a device for storing a fluid. The fluid enclosure may store a fluid physically or chemically. For example, the fluid enclosure may chemically store a fluid in active material particles.

As used herein, "active material particles" refer to material particles capable of storing hydrogen or other fluids or to material particles that may occlude and desorb hydrogen or another fluid. Active material particles may include fluid-storing materials that occlude fluid, such as hydrogen, by chemisorption, physisorption or a combination thereof. Some hydrogen-storing materials desorb hydrogen in response to stimuli, such as change in temperature, change in heat or a change in pressure. Examples of hydrogen-storing materials that release hydrogen in response to stimuli, include metal hydrides, chemical hydrides, suitable micro-ceramics, nano-ceramics, boron nitride nanotubes, metal organic frameworks, palladium-containing materials, zeolites, silicas, aluminas, graphite, and carbon-based reversible fluid-storing materials such as suitable carbon nanotubes, carbon fibers, carbon aerogels, and activated carbon, nano-structured carbons or any combination thereof. The particles may also include a metal, a metal alloy, a metal compound capable of forming a metal hydride when in contact with hydrogen, alloys thereof or combinations thereof. The active material particles may include magnesium, lithium, aluminum, calcium, boron, carbon, silicon, transition metals, lanthanides, intermetallic compounds, solid solutions thereof, or combinations thereof.

As used herein, "metal hydrides" may include a metal, metal alloy or metal compound capable of forming a metal hydride when in contact with hydrogen. Metal hydride compounds can be generally represented as follows: $AB$, $AB_2$, $A_2B$, $AB_5$ and BCC, respectively. When bound with hydrogen, these compounds form metal hydride complexes.

As used herein, "occlude" or "occluding" or "occlusion" refers to absorbing or adsorbing and retaining a substance, such as a fluid. Hydrogen may be a fluid occluded, for example. The fluid may be occluded chemically or physically, such as by chemisorption or physisorption, for example.

As used herein, "desorb" or "desorbing" or "desorption" refers to the removal of an absorbed or adsorbed substance. Hydrogen may be removed from active material particles, for example. The hydrogen or other fluid may be bound physically or chemically, for example. As used herein, "contacting" refers to physically, chemically, electrically touching or within sufficiently close proximity. A fluid may contact an enclosure, in which the fluid is physically forced inside the enclosure, for example.

As used herein, "composite fluid storage material" refers to active material particles mixed with a binder, wherein the binder immobilizes the active material particles sufficient to maintain relative spatial relationships between the active material particles. Examples of composite fluid storage materials are found in commonly-owned U.S. patent application Ser. No. 11/379,970, filed Apr. 24, 2006, which published as U.S. Patent Application Publication No. US 2006-0237688 A1, and whose disclosure is incorporated by reference herein in their entirety. An example of a composite fluid storage material is a composite hydrogen storage material.

As used herein, "electrochemical layer" refers to a sheet including one or more active functional members of an electrochemical cell. For example, an electrochemical layer may include a fuel cell layer. As used herein, "active functional members" refers to components of an electrochemical cell that function to convert chemical energy to electrical energy or convert electrical energy to chemical energy. Active functional members exhibit ion-conductivity, electrical conductivity, or both.

As used herein, "electrochemical cell" refers to a device that converts chemical energy to electrical energy or converts electrical energy to chemical energy. Examples of electrochemical cells may include galvanic cells, electrolytic cells, electrolyzers, fuel cells, batteries and metal-air cells, such as zinc air fuel cells or batteries. Any suitable type of electrochemical cell including fuel cells and appropriate materials can be used according to the present invention including without limitation proton exchange membrane fuel cells (PEMFCs), solid oxide fuel cells (SOFCs), molten carbonate fuel cell (MCFCs), alkaline fuel cells, other suitable fuel cells, and materials thereof. Further examples of fuel cells include proton exchange membrane fuel cells, direct methanol fuel cells, alkaline fuel cells, phosphoric acid fuel cells, molten carbonate fuel cells or solid oxide fuel cells.

An electrochemical cell layer, such as a fuel cell layer, may include one or more anodes, cathodes, and electrolyte interposed between the anodes and cathodes. In a fuel cell system, the cathodes may be supplied with air containing oxygen for use as an oxidizing agent, and the anodes may be supplied with hydrogen, for example, for use as fuel. The oxidizing agent may be supplied from air surrounding the fuel cell system, while the fuel or other reactant fluid may be supplied from the fluid reservoir.

Arrays of unit cells can be constructed to provide varied-power generating electrochemical cell layers in which the entire electrochemical structure is contained within the layer. This means additional components such as plates for collecting currents etc. can be eliminated, or replaced with structures serving different functions. Structures like those described herein are well adapted to be manufactured by continuous processes. Such structures can be designed in a way which does not require the mechanical assembly of individual parts. In some embodiments, the conductive path lengths within this structure may be kept extremely short so that ohmic losses in the catalyst layer are minimized. Array may refer to a plurality of individual unit cells. The plurality of cells may be formed on a sheet of ion exchange membrane material, a substrate, or may be formed by assembling a number of components in a particular manner.

Unit cells according to the invention may be used in a planar electrochemical cell layer that is conformable to other geometries, as described in application Ser. No. 11/185,755, filed on 21 Jul. 2004, entitled "DEVICES POWERED BY CONFORMABLE FUEL CELLS," which has published as U.S. Patent Application Publication No. US 2007-0090786 A1, and application Ser. No. 60/975,132, filed 25 Sep. 2007, entitled "FLEXIBLE FUEL CELL," which are hereby incorporated by reference.

Arrays can be formed to any suitable geometry. Examples of planar arrays of fuel cells are described in co-owned U.S. application Ser. No. 11/047,560 filed on 2 Feb. 2005 entitled "ELECTROCHEMICAL CELLS HAVING CURRENT CARRYING STRUCTURES UNDERLYING ELECTROCHEMICAL REACTION LAYERS", which has published as U.S. Patent Application Publication No. US 2005-0250004 A1, the disclosure of which is herein incorporated by reference. Fuel cells in an array can also follow other planar surfaces, such as tubes as found in cylindrical fuel cells. Alternately or in addition, the array can include flexible materials that can be conformed to other geometries.

Figure 1A:
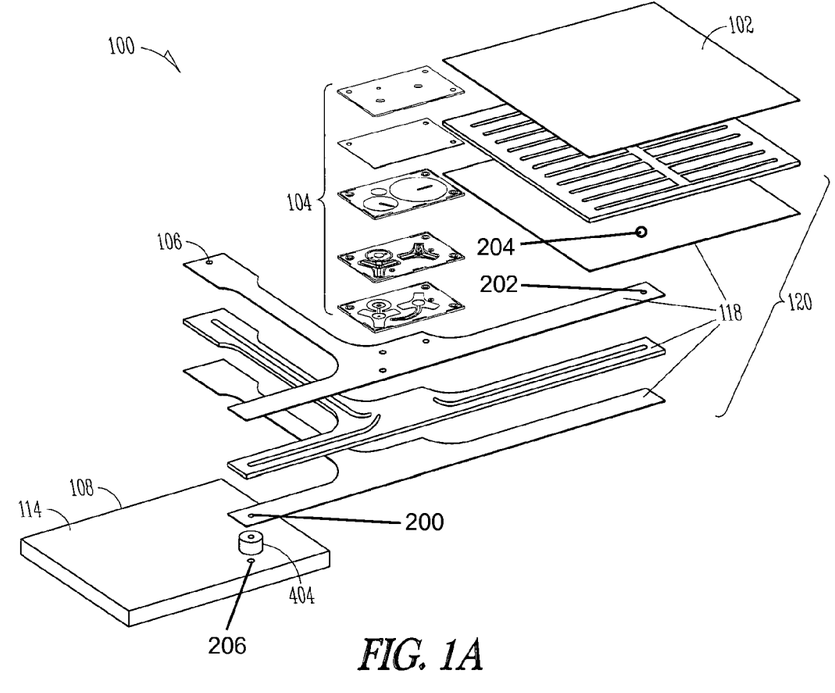
FIG. 1A illustrates an exploded view of a electrochemical cell system as constructed in accordance with at least one embodiment.

Referring to FIG. 1A, an example of an electrochemical cell system, such as an electrochemical cell system 100 is shown. Although the term electrochemical cell system is used herein, it should be noted that the system can be used for any electrochemical cell system. The electrochemical cell system 100, which may be characterized as a fuel cell assembly, includes one or more of a fuel cell 102, a fuel cell fuel system 104, a charge port 106, and fuel storage 108. The fuel cell fuel system 104 includes a layered structure including, but not limited to, at least one pressure regulator, at least one check valve, at least one flow valve. In an option, the at least one pressure regulator, the at least one check valve, at least one flow valve include featured layers that are stacked together and operatively interact together, for example as discussed in co-pending U.S. application Ser. No. 12/053,374, filed on Mar. 21, 2008 entitled "FLUIDIC CONTROL SYSTEM AND METHOD OF MANUFACTURE", which has published as U.S. Patent Application Publication No. US 2008-0233446 A1 and is incorporated herein by reference in its entirety. The electrochemical cell system 100 further includes a manifold 118, such as a fuel manifold 120 fluidly coupled with a fluid enclosure 114, such as the fuel storage 108. The manifold 118 is also fluidly coupled with the fuel cell 102. The fluid coupling for the fuel manifold and the fuel storage can include, but is not limited to compression seals, adhesive bonds, or solder connections. Although a fuel manifold is discussed as an example, the manifold can also be used to distribute, deliver, or remove other types of fluids, such as, but not limited to water, oxidant, or a cooling fluid.

Devices for detachably coupling the fluid coupling, such as a pressure activated valve, can be used. For example, pressure activated one-way valve allows a flow of fluid, for example, fluid fuel, into a fluid enclosure for a fuel storage system. The flow of fuel is allowed into a fluid reservoir during refueling, but does not allow fuel to flow back out of the fuel reservoir. In an option, flow of fuel is permitted to flow back out of the fluid reservoir if the fluid reservoir is over pressurized with fuel.

An external refueling device can form a seal against a portion of the sealing surface, for example, around the inlet port with a seal, such as an o-ring or gasket. Fuel is introduced into the fluid control system, and the fluidic pressure of the fuel compresses the compressible member and breaks the seal between the compressible member and the outside cover. In another option, an environment surrounding the exterior of the outside cover may be pressurized with fuel to force fuel through the refueling valve assembly and into the fuel reservoir.

When the fueling process is complete, the refueling fixture is removed from the valve assembly, and the valve becomes closed. For example, the compressible member decompresses, and fluidic pressure from the fuel reservoir through the fuel outlet port exerts pressure on to the compressible member and presses the compressible member against the outside cover. The decompression of the compressible member and/or the fluid pressure from the reservoir creates a seal between the compressible member and the outside cover such that fuel does not flow past the compressible member and into the fuel inlet port. In another option, the compressible member and/or the fluid diffusion member can be designed to intentionally fail if the pressure in the fuel reservoir becomes too great, or greater than a predetermine amount. Additional examples and details of valves can be found in commonly owned co-pending patent application entitled REFUELING VALVE FOR A FUEL STORAGE SYSTEM AND METHOD THEREFOR, filed on Jan. 9, 2007, having Ser. No. 11/621,542, and U.S. Patent Application Publication No. US 2010-0258214 A1 and which is incorporated by reference in its entirety.

In another option, a fluid coupling assembly can be used to couple the system with another component. The coupling assembly includes a first coupling member, a second coupling member, and a seal member therebetween. The first coupling member and the second coupling member are magnetically engagable, such as by way of a first magnetic member and a second magnetic member having attracted polarities. The engagement of the first coupling member and the second coupling member opens a fluid flow path therebetween. When the coupling members are disengaged, this fluid flow path is sealed. Additional examples and details can be found in commonly owned co-pending application entitled MAGNETIC FLUID COUPLING ASSEMBLIES AND METHODS, filed Nov. 7, 2007, having Ser. No. 11/936,662, and having U.S. Patent Application Publication No. US 2008-0143098 A1 and which is incorporated herein by reference in its entirety.

In a further option, the system includes a strain absorbing interface 404 for contacting the fluid enclosure. For instance, the interface is used for a rigid or semi-rigid component and a flexible fluid enclosure. The interface absorbs any strain due to dimensional changes in the fluid enclosure as it charges with hydrogen. Rigid components, such as mounts or fluidic devices for fuel cell communication, can be coupled to the fluid enclosure through the flexible interface and not risk sheering due to mechanical stress. The flexible interface allows for more component configurations and applications for use with a flexible fluid enclosure. The flexible interface absorbs strain and supports the connection between component and enclosure. Additional examples and details can be found in commonly owned co-pending patent application entitled INTERFACE FOR FLEXIBLE FLUID ENCLOSURES, filed on Mar. 21, 2008, having U.S. application Ser. No. 12/052,829, and having U.S. Patent Application Publication No. US 2008-0230401 A1 and which is incorporated herein by reference in its entirety.

Figure 6:
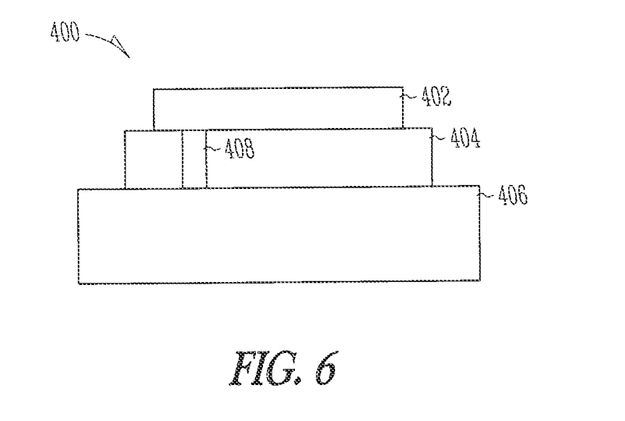
FIG. 6 illustrates a view of an enclosure with an interface as constructed in accordance with at least one embodiment.

Referring to FIG. 6, a cross-sectional view of a flexible fluid enclosure interface system 400 is shown, according to some embodiments. The system 400 includes a flexible fluid enclosure 406 in contact with a strain absorbing interface 404 on a first side. On a second side, the interface 404 may be in contact with a featured layer 402. The featured layer may include a plurality of featured layers, or one or more featured layers that collectively form a functional control system component. An optional fluidic connection 408 may be positioned in the strain absorbing interface 404, connecting the enclosure 406 and featured layer 402.

The fluid enclosure may be flexible. For example, a flexible fluid enclosure may include a flexible liner for storing a fluid. The fluid enclosure can include fuel cartridges, such as replaceable fuel cartridges, dispenser cartridges, disposable fuel ampoules, refillable fuel tanks or fuel cell cartridges, for example. The fuel cartridge may include a flexible liner that is connectable to a fuel cell or fuel cell layer. The fuel cartridge may also include a connecting valve for connecting the cartridge to a fuel cell, fuel cell layer or refilling device. The fluid enclosure 406 may be an enclosure formed by conformably coupling an outer wall to a composite hydrogen storage material, for example.

Conformably coupled refers to forming a bond that is substantially uniform between two components and are attached in such as way as to chemically or physically bind in a corresponding shape or form. A structural filler or composite hydrogen storage material may be conformably coupled to an outer enclosure wall, for example, in which the outer enclosure wall chemically or physically binds to the structural filler or composite hydrogen storage material and takes its shape. The outer enclosure wall is the outermost layer within a fluid enclosure that serves to at least partially slow the diffusion of a fluid from the enclosure. The outer enclosure wall may include multiple layers of the same or differing materials. The outer enclosure wall may include a polymer or a metal, for example. The fluid may be hydrogen, for example. Examples of such enclosures may be found in commonly owned U.S. patent application Ser. No. 11/473,591, filed Jun. 23, 2006.

The strain absorbing interface 404 may be manufactured of any suitable material that allows it to be flexible, absorb strain and bond to the enclosure 406 and featured layer 402. The material chosen should provide a suitable bond, physical or chemical, between the featured layer 402 and enclosure 406 and also allow for the differential in strain between the strain of the enclosure wall and the rigidity of the featured layer 402, so that the sheer stress on any bonds does not exceed the strength of such bonds. The strain absorbing interface 404 may be manufactured of an elastomeric material or silicon material, for example. Elastomeric materials may include thermoplastic elastomers, polyurethane thermoplastic elastomers, polyamides, melt processable rubber, thermoplastic vulcanizate, synthetic rubber and natural rubber, for example. Examples of synthetic rubber materials may include nitrile rubber, fluoroelastomers such as Viton® rubber (available from E.I. DuPont de Nemours, a Delaware corporation), ethylene propylene diene monomer rubber (EPDM rubber), styrene butadiene rubber (SBR), and Fluorocarbon rubber (FKM).

Figure 7:
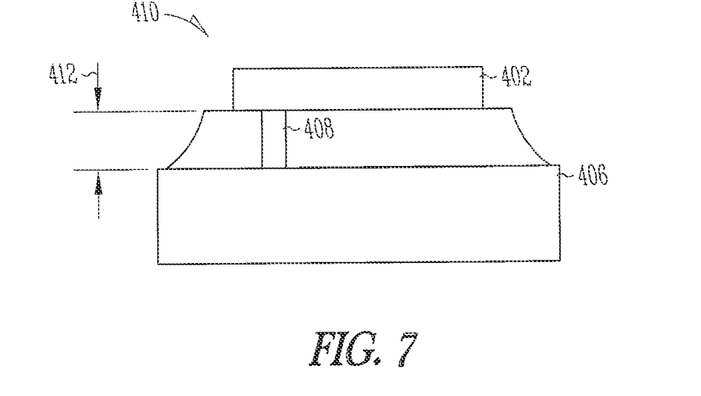
FIG. 7 illustrates a side view of an enclosure with an interface as constructed in accordance with at least one embodiment.

As the fluid enclosure 406 is filled with fluid, or charged, the dimensions of the enclosure 406 increase (see FIG. 7). The strain absorbing interface 404 may deform or change in dimension, such as in thickness 412, as it is strained (see FIG. 7). The strained interface 404 then maintains a consistent, less stressful contact between the enclosure 406 and featured layer 402. The featured layer 402 would then undergo little to no strain, as the strained interface 404 absorbs strain caused by the enclosure 406 movements. The strained interface 404 may absorb all or at least part of the strain caused by changes in dimension of enclosure 406. The strain absorbing interface or the strained interface 404 may be generally characterized as interface elements.

The featured layer 402 may be any fitting, mount, connector, valve, regulator, pressure relief device, planar microfluidic device, a plate, or any device that might control the flow of a fluid from the fluid enclosure into or out of the enclosure or combinations thereof, for example. Examples of fluids include, but are not limited to, gas, liquefied gas, liquid or liquid under pressure. Examples of fluids may include fluid reactants, fuels, oxidants, and heat transfer fluids. Fluid fuels used in fuel cells may include hydrogen gas or liquid and hydrogen carriers in any suitable fluid form. Multiple strain absorbing interfaces 404 and multiple featured layers 402 may be utilized in conjunction with one or more fluid enclosures 406, where the featured layers form functional components such as, but not limited to, the fluidic control system, the manifold, the pressure regulator, the check valve. In another option, the interfaces 404 can be coupled with an inlet of the fluidic control system, the fuel cell, or the fluidic enclosure.

Figure 1B:
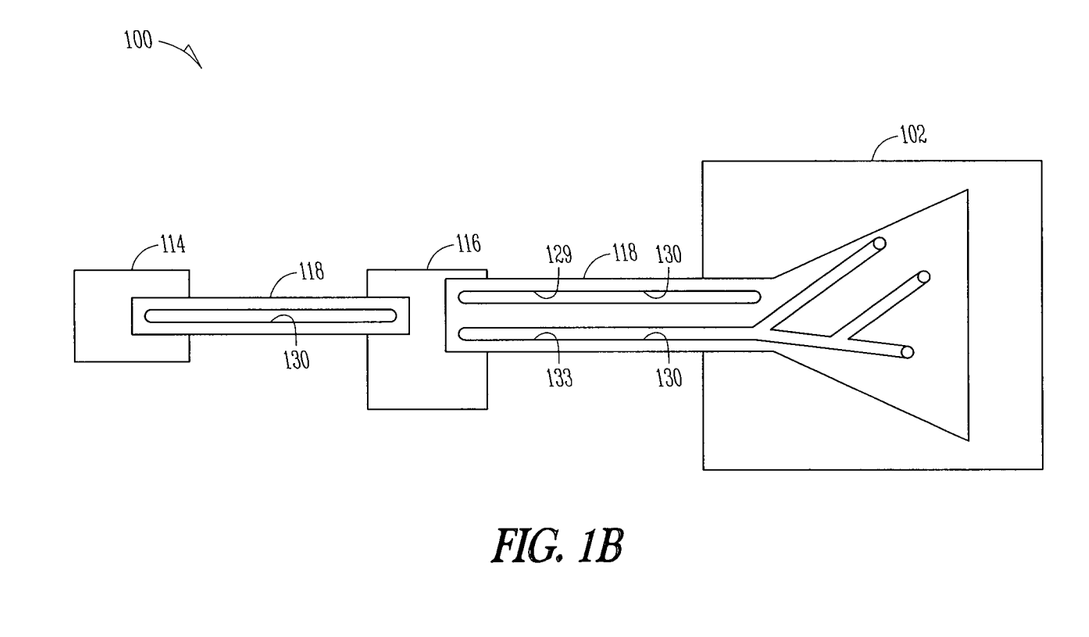
FIG. 1B illustrates a block diagram of a electrochemical cell system in accordance with at least one embodiment.

FIG. 1B illustrates additional examples for the manifold 118. A fuel cell assembly 100 includes a fluid enclosure 114 fluidly coupled with a fluidic controller, such as a pressure regulator component 116 by a manifold 118. The one or more fluid control components can include, but are not limited to a fluidic control system, inlets, outlets, a check valve component, a flow valve component, a charge valve component, a pressure relief component, a conduit, an on/off valve, a manual on/off valve, or a thermal relief component.

The pressure regulator 116 is fluidly coupled with a fuel cell 102 via a manifold 118. The manifold 118 includes one or more conduit channels 130 therein, such as may provide a single ingress and multiple egresses as shown in FIG. 1B. In a further option, the manifold 118 fluidly coupled with the pressure regulator component 116 and the fuel cell 102 can further include at least one feedback channel or conduit 129 and a delivery channel 133. The delivery channel 133 delivers fluid such as a fuel to the fuel cell 102. The feedback channel 129 allows for the regulator to be piloted based on the feedback to the pressure regulator component 116 from pressure in the fuel plenum, and is fluidly coupled to a fluid plenum of the electrochemical cell system. Additional examples and details can be found in commonly owned co-pending patent application entitled FLUIDIC DISTRIBUTION SYSTEM AND RELATED METHODS, filed on Mar. 21, 2008, having U.S. application Ser. No. 12/053,408, and having U.S. Patent Application Publication No. US 2007-0295617 A1 and which is incorporated by reference in its entirety.

Figure 5:
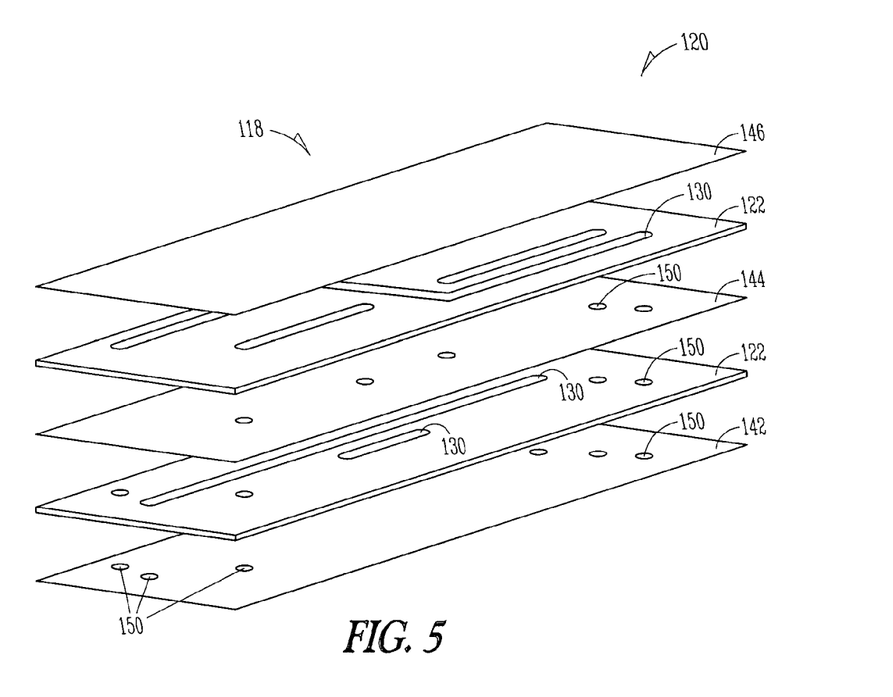
FIG. 5 illustrates an exploded perspective view of a fluid manifold as constructed in accordance with at least one embodiment.

Each of the components of the electrochemical cell system 100 can be formed by the flexible layered structured as discussed above and below. In a further option, the one or more conduit channels 130 include a gas conduit channel. Multiple ports, channels, including conduit channels or delivery channels are possible, such as shown in FIGS. 5 and 6.

Figure 2:
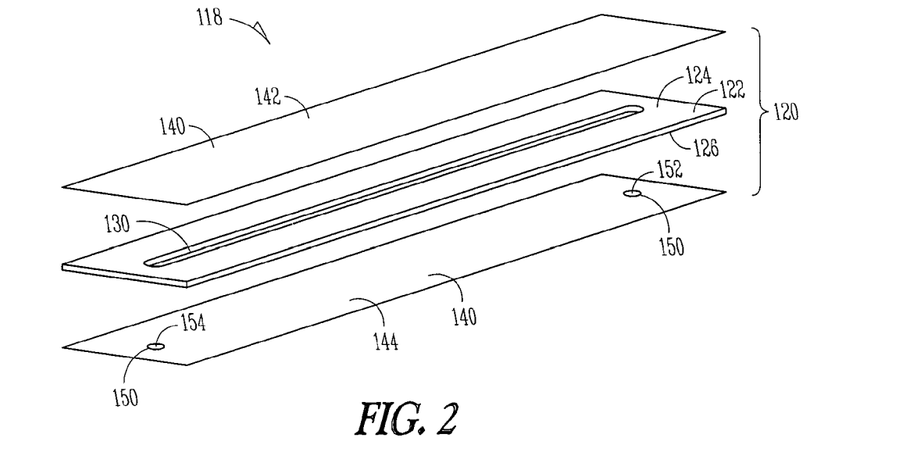
FIG. 2 illustrates an exploded perspective view of a fluid manifold as constructed in accordance with at least one embodiment.

Referring to FIG. 2, the manifold 118, such as the fuel manifold 120, includes a layered structure formed of multiple, thin, flexible featured layers. The layered structure is made small, nano-fabrication technologies, and/or micro fabrication technologies can be employed to produce and assemble the layers. For instance, processes for producing and/or assembling the layers include, but are not limited to, microfluics application processes, or chemical vapor deposition for forming a mask, and followed by a process such as etching. In addition, materials for use in fabricating the thin layered structure includes, but is not limited to, silicon, polydimethylsiloxiane, parylene, or combinations thereof. The manifold 120, as evident from FIG. 1A, includes a first manifold coupled to the fuel cell 102, and a second manifold connecting the first manifold to an outlet 206 that is fluidly connected to the fluid enclosure 114. Port 204 connects the first manifold to the outlet 202 of the second manifold.

The featured layers include one or more features. In an option, the featured layers of the layered structure provides a gas-tight seal such that the featured layers are gas-tight. For example, a bond is provided with the layers that is impermeable to a fluid. In another example, the bond may be substantially impermeable to hydrogen or any other fluid at or below 350 psi or 2.5 MPa. Examples of fluids include, but are not limited to, hydrogen, methanol, formic acid, butane, borohydrides, water, air, or combinations thereof. In another option, the bond is substantially impermeable to fluid at or below 150 psi or 1.03 MPa. In yet another option, the bond is substantially impermeable to fluid at or below 15-30 psi or 0.10-0.21 MPa. The layered structure allows for the manifold to be of a size that does not take up unnecessary volume, nor an unnecessarily large footprint, yet allows for the pressure, volume, and temperature requirements for fuel cell fuel supply systems to be met. The multiple layers can be coupled together by thermal bonding, adhesives, soldering, ultrasonic welding, etc.

The manifold 118 can be made of relatively thin layers of material, allowing for the manifold 118 to be flexible. In an option, the manifold 118, and/or the featured layers that make up the manifold 118, such as, but not limited to the conduit layer 122 and/or the barrier layer, are flexible enough to have a bend radius of about 1-5 mm. In a further option, the manifold 118, and/or the featured layers, and/or the conduit layer 122, and/or the barrier layer have a bend radius of no less than about twice a thickness of a single featured layer, where the thickness is optionally less than 1 mm to 200 microns. The flexible manifold can be bent around components, or wrapped around components, providing greater number of assembly options for the electrochemical cell system.

The manifold 118, for fluid, includes at least one featured layer, such as a conduit layer 122 defined in part by a first side 124 and a second side 126. In an option, the at least one conduit layer 122 is relatively thin, for example, compared with the length and width. In an example, the thickness of the at least one conduit layer 122 is generally less than about 1 mm. In another example, the thickness of the at least one conduit layer 122 is about 5 μm-1 mm. In an example, the width and length of the conduit layer 122 is about 1 mm and 100 mm, respectively. In another example, the thickness of the at least one conduit layer 122 is about 100 and the width and length of the conduit layer 122 is about 1 mm and 1.5 mm, respectively. The width and/or the length can be altered for geometry of the system in which the manifold 118 is installed.

In a further option, the thickness of the layer is about 10-500 micron, and a dimension of the conduit channel, such as a height or a width or a channel depth, is about 50 micron to 1 mm. The layer is highly planar such that a width of the manifold is greater than about thirty times the dimension of the conduit channel. In another option, the width of the planar portion of the manifold is greater than three times the dimension of the conduit channel.

Figure 3A:
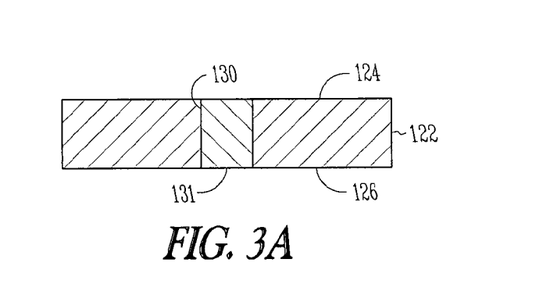
FIG. 3A illustrates a cross-sectional view of a conduit layer as constructed in accordance with at least one embodiment.
Figure 3B:
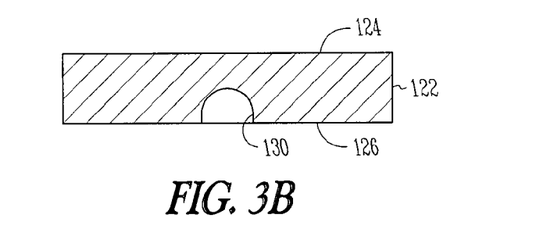
FIG. 3B illustrates a cross-sectional view of a conduit layer as constructed in accordance with at least one embodiment.
Figure 4:
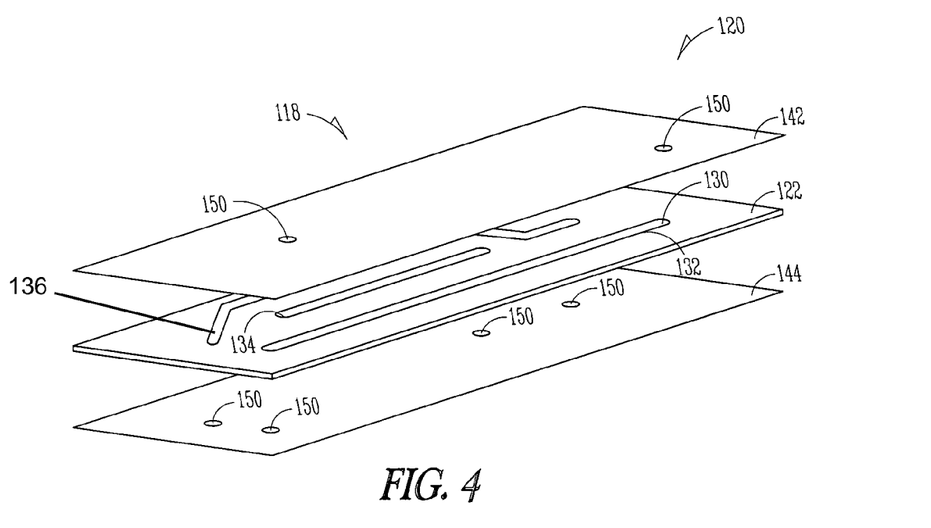
FIG. 4 illustrates an exploded perspective view of a fluid manifold as constructed in accordance with at least one embodiment.

The at least one conduit layer 122 includes at least one conduit channel 130 therein. In an option, the conduit layer 122 includes a plurality of conduit channels 130 in the conduit layer 122, and in a further option, in each of the conduit layers 122. The plurality of conduit channels 130 are disposed adjacent one another in a single layer. The at least one conduit channel 130 can also be a recess or a partial recess or channel, and is a conduit channel that allows for material such as a fluid to flows therethrough. The at least one conduit channel 130, in an option, extends through the conduit layer 122, from the first side 124 to the second side 126, as shown in FIG. 2 and FIG. 3A. In another option, the at least one conduit channel 130 extends only partially within a side of the conduit layer 122, as shown in FIG. 3B. In yet another option, the conduit layer 122 includes two or more conduit channels 130, within a single conduit layer. For example, two or more conduit channels 130 which extend from the first side 124 to the second side 126 can be disposed within the conduit layer 122, as shown in FIG. 4. The two or more conduit channels 130 can include recesses that extend partially within a side of the conduit layer 122 (FIG. 3B) and/or the conduit channels 130 can extend through the conduit layer 122 (i.e. from the first side 124 and through the second side 126). The conduit channels 130 that extend partially within the featured layer, optionally can be fluidly coupled with one another.

The two or more conduit channels 130 can be formed within the featured layer such as the conduit layer 122 such that they do not intersect with one another in the conduit layer 122. Alternatively, the two of more conduit channels 130 can be formed within featured layer such as the conduit layer 122 such that they do intersect with one another or are fluidly coupled in the conduit layer 122. The conduit channel 130 extends along the conduit layer 122, and allows for material such as fluid or fuel to flow therethrough. In an option, the conduit channels 130 and/or ports are sized and positioned so that flow therethrough is non-restrictive, which can be combined with any of the embodiments discussed above or below. For example, the conduit channels 130 and/or ports are sized similarly throughout the manifold so that flow therethrough is not restricted by changing the cross-sectional size of the channels or ports. In a further option, the conduit channels are delivery channels, where the channels deliver fluid such as a fuel. In a further option, the conduit channels include a feedback channel, for example for varying actuation of a regulator based on the pressure in a fuel cell fuel plenum. In yet another option, the conduit channel is a gas conduit channel.

In a further option, the conduit channel includes a channel having a surface allowing for non-restrictive flow. For example, the conduit channel has a surface roughness that is $\frac{1}{50}^{th}$ of the hydraulic diameter of the channel. In a further option, the fluid for the conduit channel includes a gas, such as a low viscosity fluid that reduces inhibitive capabilities of the channels, including, but not limited to, hydrogen.

Figure 3C:
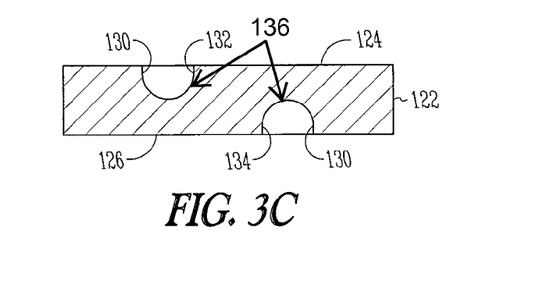
FIG. 3C illustrates a cross-sectional view of a conduit layer as constructed in accordance with at least one embodiment.

In another option, a conduit channel such as a first recess 132 can be formed on the first side 124 of the conduit layer 122, and a second recess 134 can be formed on the second side 126 of the conduit layer 122, where the first recess 132 and the second recess 134 do not necessarily extend from the first side 124 through to the second side 126. In an example shown in FIG. 3C, the partial conduit channels or recesses 136 are disposed on opposite sides of the conduit layer 122, allowing for material to travel therethrough via the recesses on the first side 124 and the second side 126.

The conduit layer 122, in another option, is formed of metals, plastics, elastomers, or composites, or a combination thereof. The at least one conduit channel 130 is formed within and/or through the conduit layer 122, in an option. For example, the at least one conduit channel 130 can be etched or stamped on, within and/or through the conduit layer 122. In another option, the at least one conduit channel 130 can be drilled within and/or through the layer, formed with a laser, molded in the conduit layer 122, die cutting the conduit layer 122, or machined within and/or through the conduit layer 122. In an option, the at least one conduit channel 130 has a width of about 5 to 50 times the depth of the recess. In another option, the at least one conduit channel 130 has a width of about 1 mm-2 mm. In yet another option, the at least one recess has a width of about 50-100 μm.

One of the featured layers of the manifold 118 further optionally includes at least one barrier layer 140, as shown in FIG. 2. The barrier layer defines a portion of the conduit channels 130, for instance a wall portion of the conduit channel 130. In a further option, the manifold 118 includes a first barrier layer 142 (which may be characterized as an upper barrier layer) and a second barrier layer 144 (which may be characterized as a lower barrier layer) disposed on opposite sides of the conduit layer 122. For example, the first barrier layer 142 abuts and seals against the first side 124 of the conduit layer 122, and the second barrier layer 144 abuts and seals against the second side 126 of the conduit layer 122. This allows for the conduit channel 130 to be enclosed and form a conduit through which material travels. The barrier layers 142, 144 can be coupled with the conduit layer 122, for example, but not limited to, using adhesives, bonding techniques, or laser welding. In a further option, the barrier layers 142, 144 and a featured layer such as the conduit layer 122 are stacked together, and further optionally sealed together. For example, the layers 122, 142, 144 are stacked and optionally coupled together through thermal bonding, adhesive bonding, gluing, soldering, ultrasonic welding, diffusion bonding, heat sealing, etc. In a further option, layers 122, 142, 144 are joined by gluing with cyano acrylate adhesive. In yet another option, layers 122, 142, 144 could be built up and selectively etched as is done for MEMS and/or integrated circuits.

The layers 122, 142, 144, in an option, include one or more bonding regions 369 allowing for flowing adhesives or other bonding agents so that layers can be bonded without the functional components, the conduit channels, or ports also being bonded. In a further option, the one or more featured layers include barrier features, such as, but not limited to, physical barriers such as ridges, or recesses and/or chemical barriers that separate bonding regions from functional regions and/or prevent bonding material from entering function regions.

In a further option, the featured layers can form one or more of the barrier layers 142, 144 including one or more ports or holes 150 therein. For example, the one or more ports 150 or a first and a second hole to form an inlet 152 and an outlet 154. The inlet and outlet 152, 154 are positioned within the second barrier layer 144 such that they are fluidly coupled with the conduit channel 130. For example, the inlet and/or outlet 152, 154 are positioned adjacent to at least one conduit channel of another featured layer, for example as shown in FIGS. 2 and 4. Material such as fluid fuel can travel in through the inlet 152, through the conduit channel 130, and out of the outlet 154. The one or more ports 150 provide fluid communication between the manifold 118 and components to which the fuel manifold 120 is coupled, such as, but not limited to, a fluid enclosure such as the fuel storage 108 (FIG. 1A) or the fuel cell 102 (FIG. 1A or 1B). The one or more ports 150 can further provide fluid communication within the manifold 118, for example, between various featured layers. It should be noted that it is possible to use the manifold 118 as a fluid distribution system where there is a single inlet 200 and multiple outlets 202 so that the manifold 118 feeds multiple locations, for example, on a fuel cell layer. FIG. 1A shows a manifold 118 with inlet 200 formed by a hole on a barrier layer and an outlet 202 formed by another hole on another barrier layer. Inlet 200 is fluidly connected to outlet 206 of fluid enclosure 108, 114, and outlet 202 is fluidly connected to port 204. The fluids usable with the manifold 118 include, but are not limited to: fuel, water, coolant, or oxidant. Examples of fluids which may be used could include, but are not limited to: hydrogen, methanol, ethanol, butane, formic acid, borohydride compounds, such as sodium and potassium borohydride, and aqueous solutions thereof, ammonia, hydrazine, silanes, or combinations thereof.

In a further option, a filter element 131 can be incorporated into a part of the flow path. For example, the filter element 131 can be disposed within the conduit channel 130, as shown in FIG. 3A. In another option, the filter element 131 can be disposed within the ports 150, such as the inlet 152. The filter element 131 can include a porous substrate or a flow constricting element. In another option, the filter element 131 can define the conduit channel 130. The filter element 131 disposed within the conduit channel 130 and/or the ports 150 assists in preventing collapsing of the conduit channel 130 and/or port 150 for instance, when the fuel manifold 120 is bent around itself or other components within the fuel cell assembly. In a further option, the conduit channel 130 extends along the conduit layer 122, and the conduit channel 130 is defined by a length. The filter element 131, in an option, extends along a portion, or the entire length of the conduit channel 130. In an option, the filter element 131 is a porous substrate.

FIGS. 4 and 5 illustrate additional options for the manifold 118, where the fluid manifold includes multiple featured layers. Referring to FIG. 4, the fuel manifold 120 includes the at least one conduit layer 122, a first barrier layer 142, and a second barrier layer 144. The first barrier layer 142 and the second barrier layer 144 include one or more ports 150 therein. The at least one conduit layer 122 includes conduit channels such as a first recess 132, a second recess 134, and a third recess 136. The first, second, and third recesses 132, 134, 136 extend in a pattern within the conduit layer 122, and line up with their respective ports when the layers are stacked together, such that there is fluid communication. The barrier layers 142, 144 can be coupled with the conduit layer 122 using, for example, but not limited to, adhesives, bonding techniques, or laser welding. In a further option, the barrier layers 142, 144 and the conduit layer 122 are sealed together.

FIG. 5 illustrates another example of a manifold 118, which also includes multiple featured layers. For instance, the manifold 118 includes multiple featured layers including at least two conduit layers 122, a first barrier layer 142, a second barrier layer 144, and a third barrier layer 146. The conduit layers 122 for the various embodiments herein can serve as a barrier layer and conduit layer, and various features such as ports or conduit channels, or partially recessed channels can be formed in one or more of the featured layers, alone or in combination. The layers include at least one conduit channel. The conduit channel includes, but is not limited to a delivery channel, or a feedback channel.

A first conduit layer is disposed between the first barrier layer 142 and the second barrier layer, and a second conduit layer is disposed between the second barrier layer 144 and the third barrier layer 146. It should be noted that additional layers, including conduit layers and barrier layers could be incorporated into the manifold 118 for additional material flow options.

The first barrier layer 142 and/or the second barrier layer 144 include one or more ports 150 therein. It is possible for the third barrier layer 146 to further include one or more ports 150 therein. The ports 150 allow for material to flow in to and out of the fuel manifold 120, and further to flow between the multiple conduit layers 122. The at least one conduit layer 122 includes one or more recesses 132, 134, 136 therein. The multiple recesses align with their respective ports when the layers are brought together, for example, by stacking the layers together and optionally sealing the layers.

The barrier layers 142, 144, 146 can be coupled with the conduit layers 122, for example, but not limited to, adhesives, bonding techniques, or laser welding. In a further option, the barrier layers 142, 144, 146 and the conduit layers 122 are sealed together. The various layers, including the featured layers and/or the barrier layers and/or the conduit layers allow for a flow path. In an option, a first flow path allows for fluid, such as gas, to be distributed on two more layers, where the first flow path extends from a first featured layer to a second featured layer. In yet another option, the flow path returns from the second featured layer to the first featured layer. In still another option, the first flow path circumnavigates a second flow path.

The fluid manifold provides a layered structure allowing for fuel distribution in a relatively small amount of space. For example, the fuel system can be made with an overall thickness of about 50-100 μm, or in another example the overall thickness is about 20-100 p.m. The fuel cell fuel manifold further allows for the transport of fuel, such as gas, while maintaining certain levels of pressure. For instance, hydrogen gas can be distributed through the layered structure of the fuel manifold while pressure in the range of 2-10 psig.

The fluid manifold interacts with or can be coupled to the fuel cell or other system components using adhesives working over comparatively large surface areas to that the force due to internal fluidic pressures that is forcing the components apart is easily overcome by the strength of the adhesive bond. A high internal pressure can be counteracted with a bond that has a relatively low tensile strength.

Figure 8:
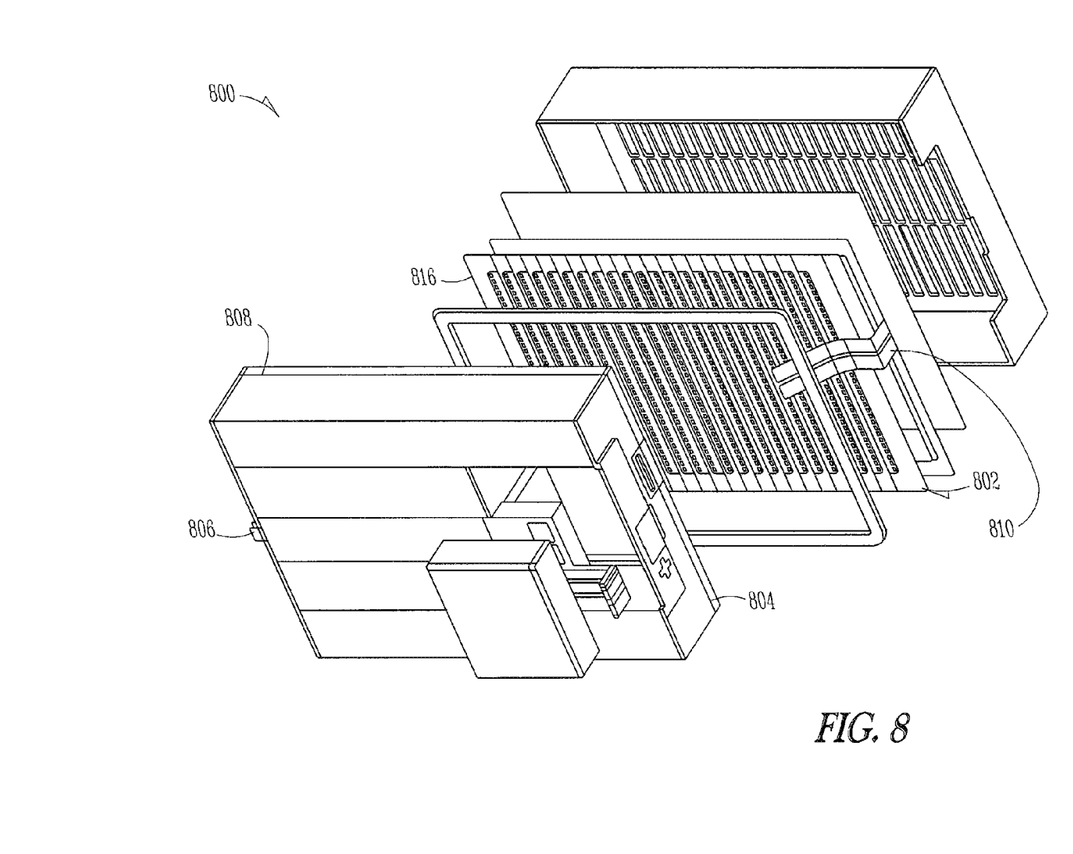
FIG. 8 illustrates an exploded view of an electrochemical cell system, as constructed in accordance with at least one embodiment.

FIG. 8 illustrates an exploded view of an electrochemical cell system, as constructed in accordance with at least one embodiment. The fuel cell system 800 includes, but is not limited to, one or more of a fuel cell layer 802, fluidic controllers 804, a charge port or inlet 806, a fluid reservoir 808, or a current collecting circuit 810. In one example, the fluid reservoir 808 is filled with fuel by pressurizing the charge port or inlet 806. In another example, power from the fuel cell layer 802 is utilized by the current collecting circuit 810, which collects the power from the fuel cell layer 802 and routes it out of the fuel cell system 800.

A method includes introducing fluid, such as a fuel, into a fluid manifold, the manifold including two or more featured layers each having a plurality of conduit channels. In an example, the fuel includes a gas or a liquid such as, but not limited to, hydrogen, hydrogen, methanol, ammonia, silanes, formic acid butane, or borohydrides. The method further includes flowing fluid through the conduit channels. The conduit channels include, but are not limited to, fuel channels, feedback channels, or delivery channels.

Several options for the method are as follows. For instance, the method optionally includes providing fuel to a fuel cell assembly, where the fluid manifold is fluidly coupled with the fuel cell. The method optionally includes flowing material from a first layer recess of a first conduit layer to a second layer recess of a second conduit layer, and/or flowing material through a porous substrate within at least one of the one or more conduit channels, and/or providing a heat transfer fluid to a electrochemical cell system through the conduit channels. The method further optionally includes providing oxidant to a electrochemical cell system through the conduit channels or removing water from the electrochemical cell system through the conduit channels.

Further options for the method are as follows. For instance, flowing fluid through one or more conduit channels includes flowing fluid along a partially recessed channel in the conduit layer, and/or flowing fluid through one or more conduit channels includes directing material along a first partial channel in the first side and along a second partial channel in the second side. In another option, the method further includes coupling with a charge port, and/or coupling with fuel storage. In still another option, the method further includes distributing fluid on two or more layers via at least a first flowpath, the first flowpath extending from a first featured layer to a second featured layer, and returning from the second featured layer to the first featured layer.

In the description of some embodiments of the invention, reference has been made to the accompanying drawings that form a part hereof, and in which are shown, by way of illustration, specific embodiments of the invention that may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the invention. The following detailed description is not to be taken in a limiting sense, and the scope of the invention is defined only by the appended claims, along with the full scope of equivalents to which such claims are entitled.

What is claimed is:

1. An electrochemical cell system comprising:
at least one fuel cell layer comprising at least one fuel cell having an anode and a cathode;
a first fluid manifold fluidly coupled to the at least one fuel cell layer to distribute a fuel to the anode of the at least one fuel cell;
a second fluid manifold fluidly connecting to the first fluid manifold and to an outlet fluidly connected to a fuel storage containing said fuel, wherein the second fluid manifold is substantially flat and comprises a plurality of layers, including at least one conduit layer positioned between an upper barrier layer and a lower barrier layer, wherein the barrier layers are substantially impermeable to said fuel, and the at least one conduit layer comprises at least one conduit extending through the at least one conduit layer, wherein said fuel flows from the fuel storage through the second fluid manifold through the first fluid manifold and to the at least one fuel cell layer, wherein the barrier layers comprise at least a first and a second hole in fluid communication with said at least one conduit in the conduit layer to form an inlet port and an outlet port, wherein the outlet port of the second fluid manifold is fluidly connected to the first fluid manifold, and the inlet port of the second fluid manifold is fluidly connected to said outlet fluidly connected to the fuel storage, wherein a portion of the barrier layer proximate the inlet port of the second fluid manifold is attached as a substantially planar interface to said outlet fluidly connected to the fuel storage.

2. The electrochemical cell system as recited in claim 1, wherein the overall thickness of the second fluid manifold is between 1 mm and 200 microns.

3. The electrochemical cell system as recited in claim 1, wherein the second fluid manifold has a bend radius of 1-5 mm.

4. The electrochemical cell system as recited in claim 1, wherein the second fluid manifold has a gas-tight seal, which is substantially impermeable to said fuel at or below 350 psi.

5. The electrochemical cell system as recited in claim 1, wherein a width of a channel of the at least one conduit is about 5 to 50 times larger than a depth of the conduit channel.

6. The electrochemical cell system of claim 1, wherein a filter is positioned in the conduit of the second fluid manifold.

7. The electrochemical cell system of claim 1, wherein the fuel storage comprises a flexible fluid enclosure and a strain absorbing interface is positioned between the outlet of the fuel storage and the inlet port of the second fluid manifold.

8. The electrochemical cell system of claim 1, wherein the second fluid manifold is connected to a pressure regulator.

9. The electrochemical cell system of claim 8, wherein the second fluid manifold further comprises a feedback conduit connecting the pressure regulator to the first fluid manifold to communicate a pressure from the first fluid manifold to the pressure regulator.

10. The electrochemical cell system of claim 1, wherein said outlet fluidly connected to the fuel storage is disposed on an interface element.

11. The electrochemical cell system of claim 10, wherein the interface element is deformable.

12. The electrochemical cell system of claim 10, wherein the interface element absorbs strain.

13. The electrochemical cell system as recited in claim 10, wherein the at least one conduit includes a single ingress and multiple egresses within the conduit layer.

14. An electrochemical cell system comprising:
at least one fuel cell layer comprising at least one fuel cell having an anode and a cathode;
a first fluid manifold fluidly coupled to the at least one fuel cell layer to distribute a fuel to the anode of the at least one fuel cell;

a second fluid manifold fluidly connecting to the first fluid manifold and to an outlet fluidly connected to a fuel storage containing said fuel, wherein the second fluid manifold is substantially flat and comprises a plurality of layers, including at least one conduit layer positioned between an upper barrier layer and a lower barrier layer, wherein the barrier layers are substantially impermeable to said fuel, and the at least one conduit layer comprises at least one conduit extending through the at least one conduit layer, wherein said fuel flows from the fuel storage through the second fluid manifold through the first fluid manifold and to the at least one fuel cell layer, wherein the barrier layers comprise at least a first and a second hole in fluid communication with said at least one conduit in the conduit layer to form an inlet port and an outlet port, wherein the outlet port of the second fluid manifold is fluidly connected to the first fluid manifold, and the inlet port of the second fluid manifold is fluidly connected to said outlet fluidly connected to the fuel storage, wherein a portion of the barrier layer proximate the inlet port of the second fluid manifold is attached as a substantially planar interface to said outlet fluidly connected to the fuel storage, wherein said outlet fluidly connected to the fuel storage is disposed on an interface element, wherein the substantially planar interface absorbs strain and is deformable.

15. The electrochemical cell system of claim 14, wherein the second fluid manifold has a bend radius of 1-5 mm and the fuel storage comprises a flexible fluid enclosure wherein the interface is connected to the fuel storage and provides a flexible interface that reduces mechanical sheer stress between the fuel storage and the second fluid manifold.

16. The electrochemical cell system of claim 15, wherein the second fluid manifold further comprises a feedback conduit connecting a pressure regulator to the first fluid manifold to communicate a pressure from the first fluid manifold to the pressure regulator.

17. An electrochemical cell system comprising:
at least one fuel cell layer comprising at least one fuel cell having an anode and a cathode;
a first fluid manifold fluidly coupled to the at least one fuel cell layer to distribute a fuel to the anode of the at least one fuel cell;
a second fluid manifold fluidly connecting to the first fluid manifold and to an outlet fluidly connected to a fuel storage containing said fuel, wherein the second fluid manifold is substantially flat and comprises a plurality of layers, including at least one conduit layer positioned between an upper barrier layer and a lower barrier layer, wherein the barrier layers are substantially impermeable to said fuel, and the at least one conduit layer comprises at least one conduit extending through the at least one conduit layer, wherein said fuel flows from the fuel storage through the second fluid manifold through the first fluid manifold and to the at least one fuel cell layer,
wherein the barrier layers comprise at least a first and a second hole in fluid communication with said at least one conduit in the conduit layer to form an inlet port and an outlet port, wherein the outlet port of the second fluid manifold is fluidly connected to the first fluid manifold, and the inlet port of the second fluid manifold is fluidly connected to said outlet fluidly connected to the fuel storage, wherein a portion of the barrier layer proximate the inlet port of the second fluid manifold is attached as a substantially planar interface to said outlet fluidly connected to the fuel storage,
wherein the at least one conduit of the at least one conduit layer comprises at least two or more conduits that do not intersect each other.

18. An electrochemical cell system comprising:
at least one fuel cell layer comprising at least one fuel cell having an anode and a cathode;
a first fluid manifold fluidly coupled to the at least one fuel cell layer to distribute a fuel to the anode of the at least one fuel cell;
a second fluid manifold fluidly connecting to the first fluid manifold and to an outlet fluidly connected to a fuel storage containing said fuel, wherein the second fluid manifold is substantially flat and comprises a plurality of layers, including at least one conduit layer positioned between an upper barrier layer and a lower barrier layer, wherein the barrier layers are substantially impermeable to said fuel, and the at least one conduit layer comprises at least one conduit extending through the at least one conduit layer, wherein said fuel flows from the fuel storage through the second fluid manifold through the first fluid manifold and to the at least one fuel cell layer,
wherein the barrier layers comprise at least a first and a second hole in fluid communication with said at least one conduit in the conduit layer to form an inlet port and an outlet port, wherein the outlet port of the second fluid manifold is fluidly connected to the first fluid manifold, and the inlet port of the second fluid manifold is fluidly connected to said outlet fluidly connected to the fuel storage, wherein a portion of the barrier layer proximate the inlet port of the second fluid manifold is attached as a substantially planar interface to said outlet fluidly connected to the fuel storage,
wherein the at least one conduit of the at least one conduit layer comprises at least two or more conduits intersecting each other.

* * * * *